(12) United States Patent
Mitsuyama

(10) Patent No.: US 7,413,239 B2
(45) Date of Patent: Aug. 19, 2008

(54) VEHICLE FENDER PANEL MOUNTING STRUCTURE

(75) Inventor: Soshi Mitsuyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/907,601

(22) Filed: Oct. 15, 2007

(65) Prior Publication Data

US 2008/0100073 A1 May 1, 2008

(30) Foreign Application Priority Data

Oct. 25, 2006 (JP) .............................. 2006-290059

(51) Int. Cl.
*B60R 27/00* (2006.01)
(52) U.S. Cl. .................. 296/187.04; 296/198
(58) Field of Classification Search ............ 296/187.12, 296/203.02, 187.09, 193.05, 198, 187.03, 296/203.03
See application file for complete search history.

(56) References Cited

U.S. PATENT DOCUMENTS

2002/0171262 A1 11/2002 Ozawa

FOREIGN PATENT DOCUMENTS

| | | |
|---|---|---|
| DE | 102 33 474 A1 | 2/2004 |
| EP | 1 258 417 A2 | 11/2002 |
| FR | 2 894 542 A1 | 6/2007 |
| JP | A 2001-287669 | 10/2001 |
| JP | A 2004-50865 | 2/2004 |

*Primary Examiner*—Joseph D Pape
(74) *Attorney, Agent, or Firm*—Oliff & Berridge, PLC

(57) ABSTRACT

A vehicle fender panel mounting structure is provided in which good protection capability may be obtained for pedestrians, even when the break line portion between the hood and the fender panel is disposed offset in the vehicle width direction further inside than the vehicle body side structural member that is the corresponding mount for the fender panel. In a body in which a break line portion, of the front fender panel and a hood, is disposed offset further to the inside in the vehicle width direction than an apron upper member, an impact absorption bracket, made up from an upper bracket and a lower bracket, is disposed in a cantilever supported state, and by rotational deformation in a direction, an outside second angled portion contacts an upright wall portion, and after that time, bending deformation occurs in a successive manner, originating at a bent portion, from an inside second angled portion toward an outside second angled portion. A reaction force in the latter half of F-S characteristics may thereby be obtained.

7 Claims, 14 Drawing Sheets

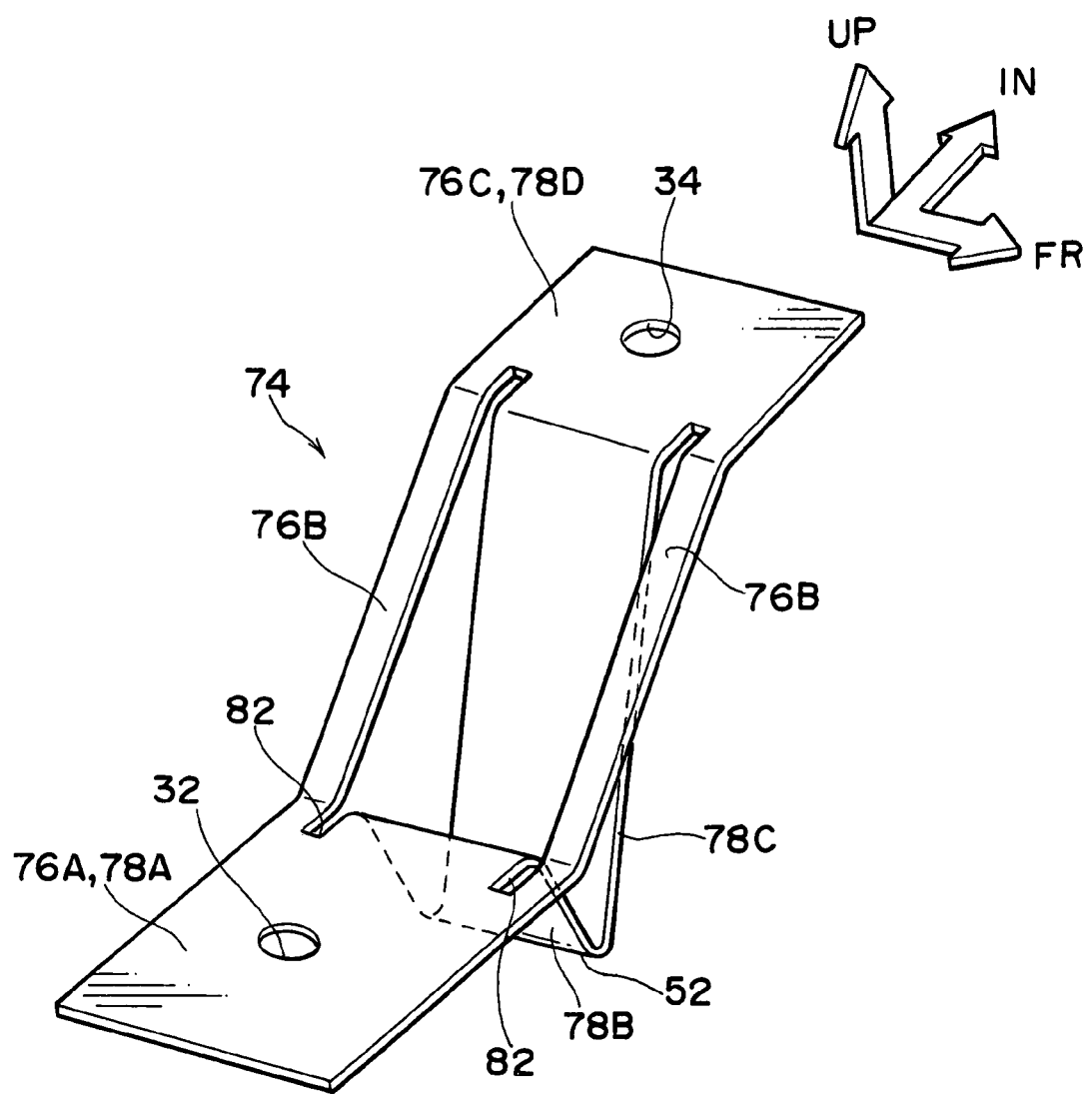

VEHICLE FENDER PANEL MOUNTING STRUCTURE

CROSS-REFERENCE TO RELATED APPLICATION

This application claims priority under 35 U.S.C 119 from Japanese Patent Application No. 2006-290059, the disclosure of which is incorporated by reference herein.

BACKGROUND OF THE INVENTION

1. Technical Field

The present invention relates to a vehicle fender panel mounting structure.

2. Related Art

In Japanese Patent Application Laid-Open (JP-A) No. 2004-50865 there is described a technology of mounting, through a fender bracket that has been formed in a substantially Z-shape when viewed from the side of the vehicle front direction, a top end inside portion of a fender panel to a top end horizontal portion of an apron upper member, and furthermore of mounting a reinforcement member, formed in a stepped shape when viewed from the side of the vehicle front direction, to the fender bracket inside in the vehicle width direction.

According to the above configuration, when an impact object has impacted in the vicinity of a break line portion between a hood and the fender panel, the stepped-shaped reinforcement member compresses in the direction it extends along, and by plastic deformation, energy is absorbed from secondary impact of the impact object in the vicinity of the break line portion between the hood and the fender panel.

SUMMARY

Whilst it may be considered that the above technology enables an increase in the pedestrian protection capabilities to be achieved, however, there are instances in which this is not successful due to the design of the vehicle. For example, the current trend in vehicle design is sometimes to adopt a design in which the break line portion between the hood and the fender panel is intruded (is offset) further to the inside in the vehicle width direction than the apron upper member. If the above conventional technology is applied to a vehicle adopting such a design, when an impact object impacts in the vicinity of the above break line portion, there is local folding and bending at the top and bottom fold points of the base portion of the fender bracket, and it is possible that insufficient reaction force is obtained in the latter half of the stroke when looking at the F-S characteristics (reaction force to deformation stroke characteristics). Therefore, there is room in the above technology for improvement in this point.

The present invention provides a vehicle fender panel mounting structure in which good protection capability may be obtained for pedestrians, even when the break line portion between the hood and the fender panel is disposed offset in the vehicle width direction further inside than the vehicle body side structural member that is the corresponding mount for the fender panel.

A first aspect of the present invention is a vehicle fender panel mounting structure including: a fender panel top end side mounting portion, disposed at a vehicle body front portion side face; a vehicle body side structural member, disposed further to the outside in the vehicle width direction, and further to the vehicle bottom side, than the fender panel top end side mounting portion, the vehicle body side structural member being the corresponding mount of the fender panel top end side mounting portion; and an impact absorption bracket joining the fender panel top end side mounting portion and the vehicle body side structural member. The impact absorption bracket includes: a first angled portion, connecting the fender panel top end side mounting portion and the vehicle body side structural member in a substantially straight line; a second angled portion, extending from a position at the top end of the first angled portion to a position that opposes in the vehicle width direction, or is able to oppose, an upright wall portion provided to the vehicle body side structural member; and a connecting portion that connects the bottom end portion of the second angled portion to the bottom end portion of the first angled portion.

BRIEF DESCRIPTION OF THE DRAWINGS

Exemplary embodiments of the present invention will be described in detail based on the following figures, wherein:

FIG. 11 is a perspective view of an impact absorption bracket (pressed one-piece type) according to a third exemplary embodiment;

DETAILED DESCRIPTION OF THE INVENTION

Herebelow, an example of an exemplary embodiment of the present invention will be described in detail with reference to the drawings.

First Exemplary Embodiment

Explanation will now be given of a first exemplary embodiment of a vehicle fender panel mounting structure according to the invention, with reference to FIG. 1 to FIG. 5. It should be noted that in the figures: the arrow direction FR refers to the vehicle front direction; the arrow direction UP to the vehicle up direction; and the arrow direction IN to the vehicle width direction inside.

Figure 1:
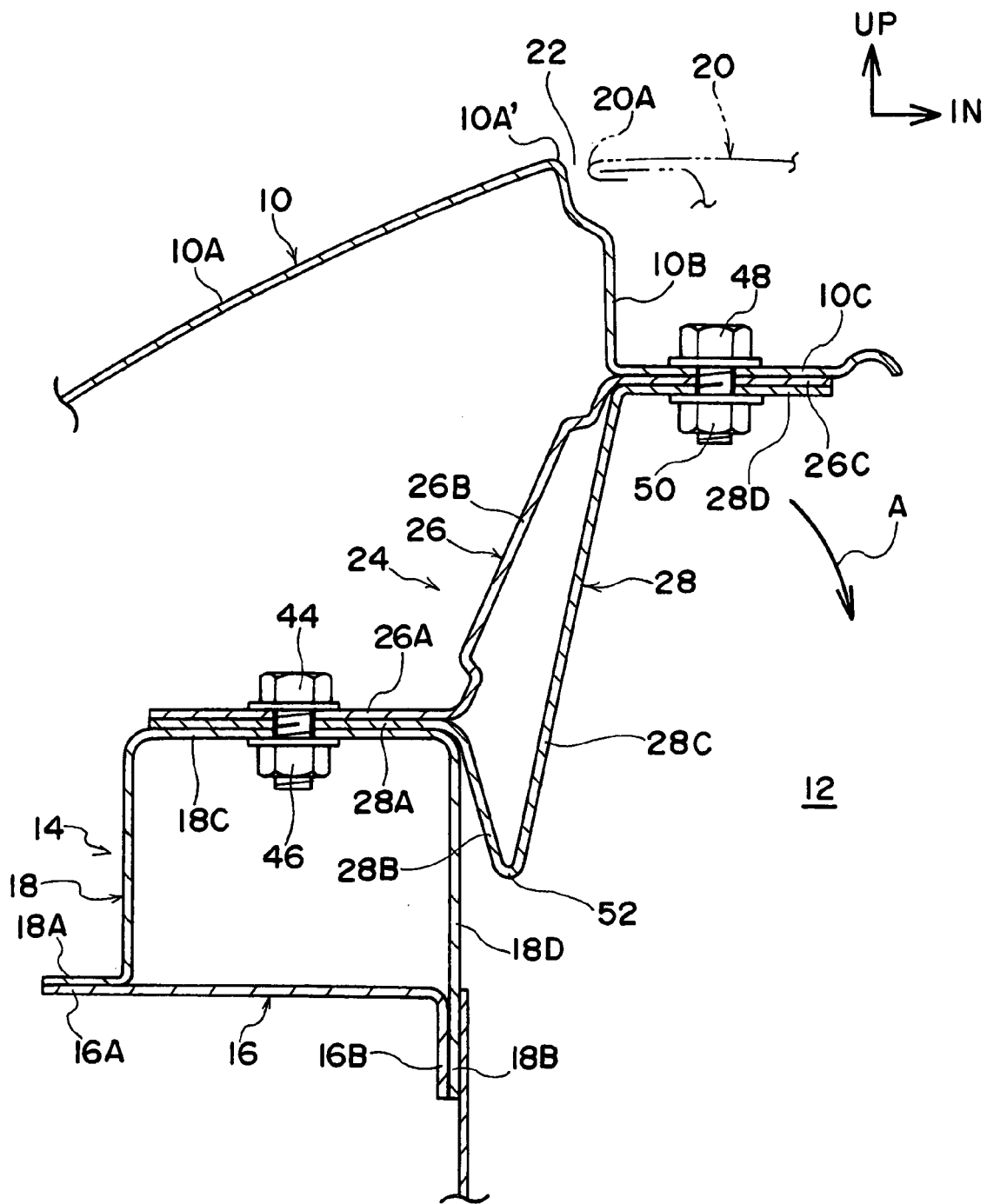
FIG. 1 is a vertical cross-section (cross-section taken on 1-1 of FIG. 2) showing the overall configuration of a vehicle fender panel mounting structure according to a first exemplary embodiment, in an assembled state.
Figure 2:
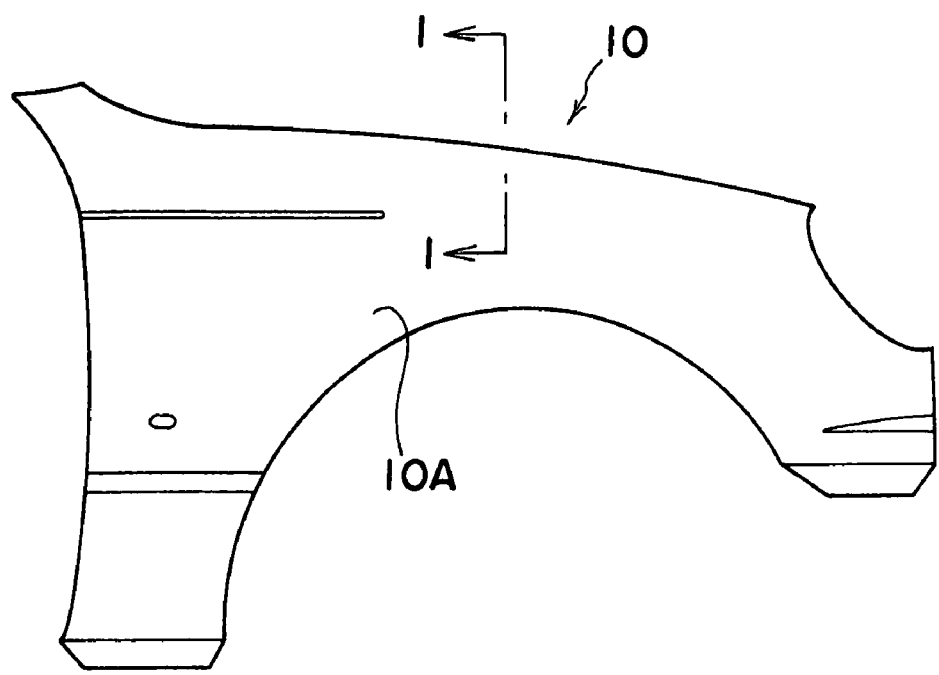
FIG. 2 is a side view of a front fender panel.

In FIG. 1, an application of the impact absorption bracket according to the present exemplary embodiment is shown in which the fender panel is in a mounted state to an apron upper member. It should be noted that FIG. 1 is a vertical cross-section showing an assembled state of the front fender panel shown in FIG. 2, sectioned along the line 1-1 and viewed from the vehicle front direction side.

As is shown in the figures, there is a front fender panel 10 provided to a side face of a vehicle front portion. The front fender panel 10 is configured including: an outside upright wall portion 10A, configuring a design surface disposed at the top side of a front wheel; an inside upright wall portion 10B, bent around and projecting substantially vertically down from the top end portion 10A' of the outside upright wall portion 10A; and, at an engine room 12 side from the bottom end portion of the inside upright wall portion 10B, a bent and folded substantially horizontal fender mounting portion 10C.

There is an apron upper member 14, serving as a vehicle side structure member, disposed below the top end portion 10A' of the outside upright wall portion 10A of the above front fender panel 10. The apron upper member 14 is a hollow long vehicle frame member that extends along the vehicle front-rear direction, and the apron upper member 14 is configured with a lower member 16 that is hooked in cross-section, and with an upper member 18 that is substantially hat shaped in cross-section. More specifically, an outside flange portion 18A of the upper member 18 overlaps at an outside portion 16A of the lower member 16, and also an inside flange portion 18B of the upper member 18 overlaps at an inside portion 16B of the lower member 16, and the apron upper member 14 is formed into a closed cross-section structure by spot welding at the respective overlaps.

There is also a hood 20 disposed between top end portions of the inside upright wall portions 10B of the left and right pair of front fender panels 10, the hood 20 configuring the upper surface of the front portion of the vehicle, and opening up and closing off the engine room 12. There is a non illustrated sealing member disposed at the lower edge side of the vehicle width direction outside edge portions 20A of the hood 20, the sealing member being configured from an elastic material (rubber) and sealing a break line portion 22 between the top end portions of the above described front fender panels 10 (the top end portions 10A' of the outside upright wall portions 10A) and the vehicle width direction outside edge portions 20A of the hood 20.

Furthermore, the fender mounting portion 10C of the above described front fender panel 10 is mounted to an upper surface portion 18C, of the upper member 18 of the apron upper member 14, through plural impact absorption brackets 24 along the vehicle front-rear direction (length direction of the apron upper member 14). The impact absorption brackets 24 are disposed at predetermined intervals along the vehicle front-rear direction.

In the present exemplary embodiment, due to the vehicle design, the above described break line portion 22, between the top end portions of the front fender panels 10 (the top end portions 10A' of the outside upright wall portions 10A) and the vehicle width direction outside edge portions 20A of the hood 20, is disposed offset further to the vehicle width direction inside (engine room 12 side) than the disposed position of the apron upper member 14 (than an upright wall portion 18D of the upper member 18).

With the above given layout, in the present exemplary embodiment, the impact absorption brackets 24 are each formed into a substantially Z-shape when viewed from the front of the vehicle, and the fender mounting portion 10C of the front fender panel 10 is mounted in a state in which it is cantilever supported (overhanging) by the upper surface portion 18C of the apron upper member 14. Explanation will now be given of details of the structure of the impact absorption brackets 24.

Figure 3:
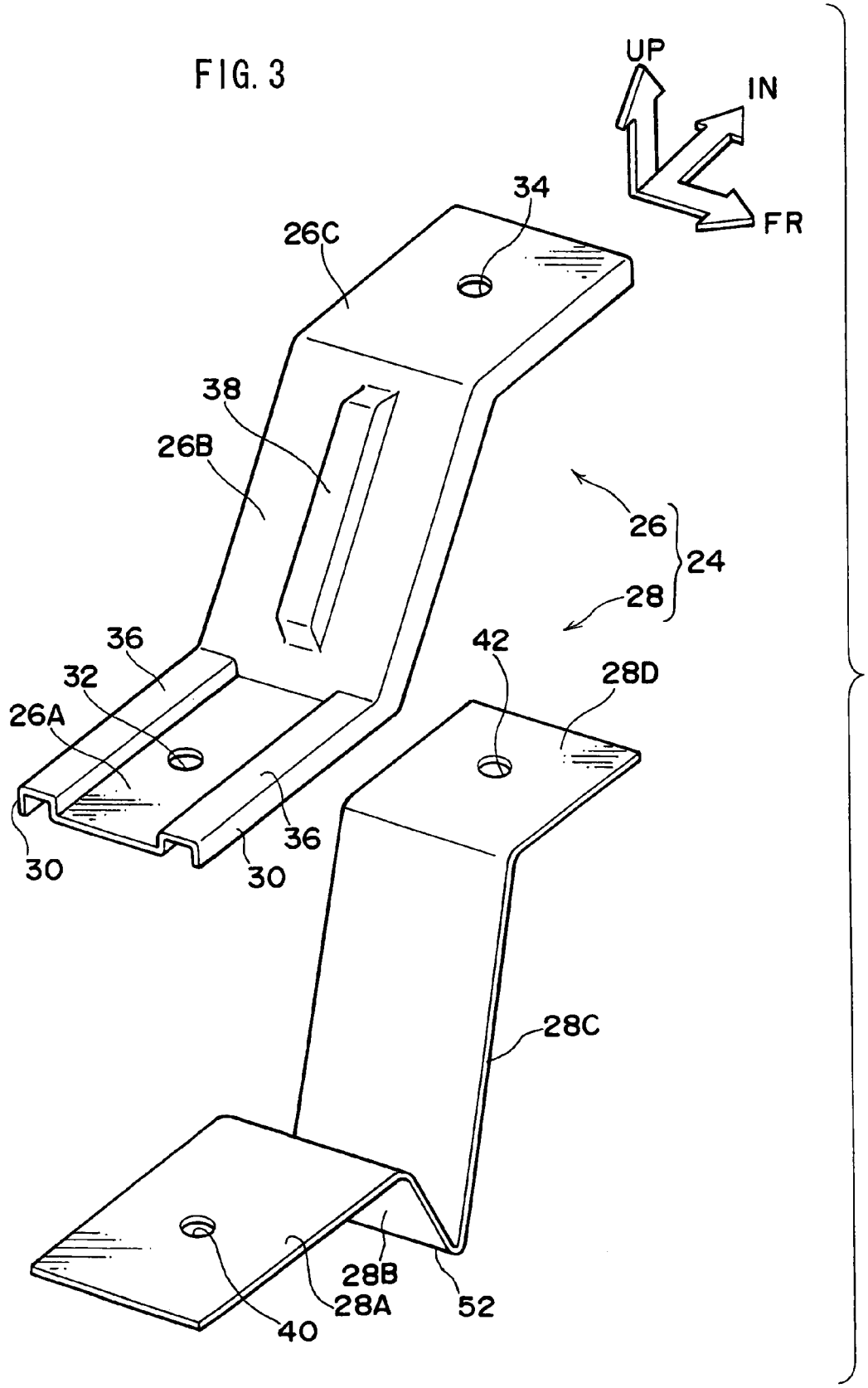
FIG. 3 is an exploded perspective view of the impact absorption bracket shown in FIG. 1.

An expanded exploded perspective view of the impact absorption bracket 24 is shown in FIG. 3. As shown in FIG. 3 and FIG. 1, the impact absorption brackets 24 are each configured by a top side bracket 26 disposed in the assembled state at the top face side, and a bottom side bracket 28 disposed in the assembled state at the bottom face side. That is to say, the impact absorption brackets 24 are each of a divided top-bottom two-piece structure.

The top side bracket 26 is formed by press-forming a predetermined width of steel plate, and is configured with: a base portion 26A extending along the vehicle width direction; a first angled portion 26B bending around from the base portion 26A and extending diagonally upward and to the inside of the vehicle; and a top end mounting portion 26C bending around from the top end portion of the first angled portion 26B toward the vehicle width direction inside and disposed at the bottom face side of the fender mounting portion 10C.

It should be noted that front-rear edge portions 30 of the top side bracket 26 are folded and bent around at right angles to face toward the bottom of the vehicle. There are also bolt insertion holes 32, 34 formed, respectively, to the base portion 26A and to the top end mounting portion 26C. Furthermore, there is a pair of first beads 36 formed so as to protrude out to the vehicle top side at positions adjacent to the front-rear edge portions 30 of the base portion 26A. There is also a second bead 38 formed as a protrusion that projects at right angles out from the surface (diagonally toward the top and outside of the vehicle) at an intermediate portion in the width direction of the first angled portion 26B. Since the second bead 38 is for increasing the surface rigidity of the first angled portion 26B, the length thereof is set so as not to affect the upper and lower bend lines (fold lines) of the first angled portion 26B. The first beads 36 are set so as to increase the mounting strength and rigidity of the base portion 26A of the top side bracket 26.

The bottom side bracket 28 is formed by press-forming steel plate of a predetermined width, and is configured with: a base portion 28A, extending along the vehicle width direction; an outside second angled portion 28B, bending around from the base portion 28A and extending diagonally to the lower and inner side of the vehicle; and an inside second angled portion 28C, folded back diagonally from the bottom end portion of the outside second angled portion 28B toward the upper and inner side of the vehicle; and a top end mounting portion 28D, folded and bent around from the top end portion of the inside second angled portion 28C toward the vehicle width direction inside and disposed in a state of contact with the bottom face of the top end mounting portion 26C of the top side bracket 26. In other words, in the impact absorption brackets 24, by setting the outside second angled portion 28B in the bottom side bracket 28, the impact absorption brackets 24 are extended out to a position so that they oppose, in the vehicle width direction, the upright wall portion 18D of the apron upper member 14.

It should be noted that the width direction dimension of the bottom side bracket 28 (dimension along the vehicle front-rear direction) is set to match the distance between the opposing faces of the front-rear edge portions 30 of the top side bracket 26, and the structure is such that the top side bracket 26 fits over the bottom side bracket 28. Also, the length along the vehicle width direction of the base portion 28A and that of the top end mounting portion 28D are set to be the same, respectively, as the length along the vehicle width direction of the base portion 26A and that of the top end mounting portion 26C of the top side bracket 26. Furthermore, there are bolt insertion holes 40, 42 formed, respectively, in the base portion 28A and the top end mounting portion 28D, coaxially to the bolt insertion holes 32, 34 formed, respectively, in the base portion 26A and the top end mounting portion 26C of the top side bracket 26.

For further clarification, the above described outside second angled portion 28B of the bottom side bracket 28 corresponds to the "connection portion" of the present invention, and the inside second angled portion 28C corresponds to the "second angled portion".

As shown in FIG. 1, in the above described impact absorption brackets 24, when in the state in which the top side bracket 26 is fitted over the bottom side bracket 28, both the base portions 26A, 28A are mounted to the upper surface portion 18C of the apron upper member 14, and fastened by bolt 44 and weld nut 46. Also, the top end mounting portion 26C of the top side bracket 26 and the top end mounting portion 28D of the bottom side bracket 28 together with the fender mounting portion 10C are fastened in a three-layer overlapped state by a bolt 48 and a nut 50.

Explanation will now be given of the operation and effect of the present exemplary embodiment.

Since the present exemplary embodiment is applied to a vehicle design in which the break line portion 22, between the top end portions of the top end portions 10A' of the front fender panel 10 and the vehicle width direction outside edge portions 20A of the hood 20, is disposed offset further to the vehicle width direction inside (engine room 12 side) than the disposed position of the apron upper member 14, the impact absorption brackets 24 are in a state of being cantilever supported to the upper surface portion 18C of the apron upper member 14. Therefore, when an impact object impacts in the vicinity of the break line portion 22, since the impact absorption brackets 24 do not have a supporting member from below, the break line portion 22 tends to tilt in toward the vehicle width direction inside (to the direction of arrow A side of FIG. 1).

Figure 4:
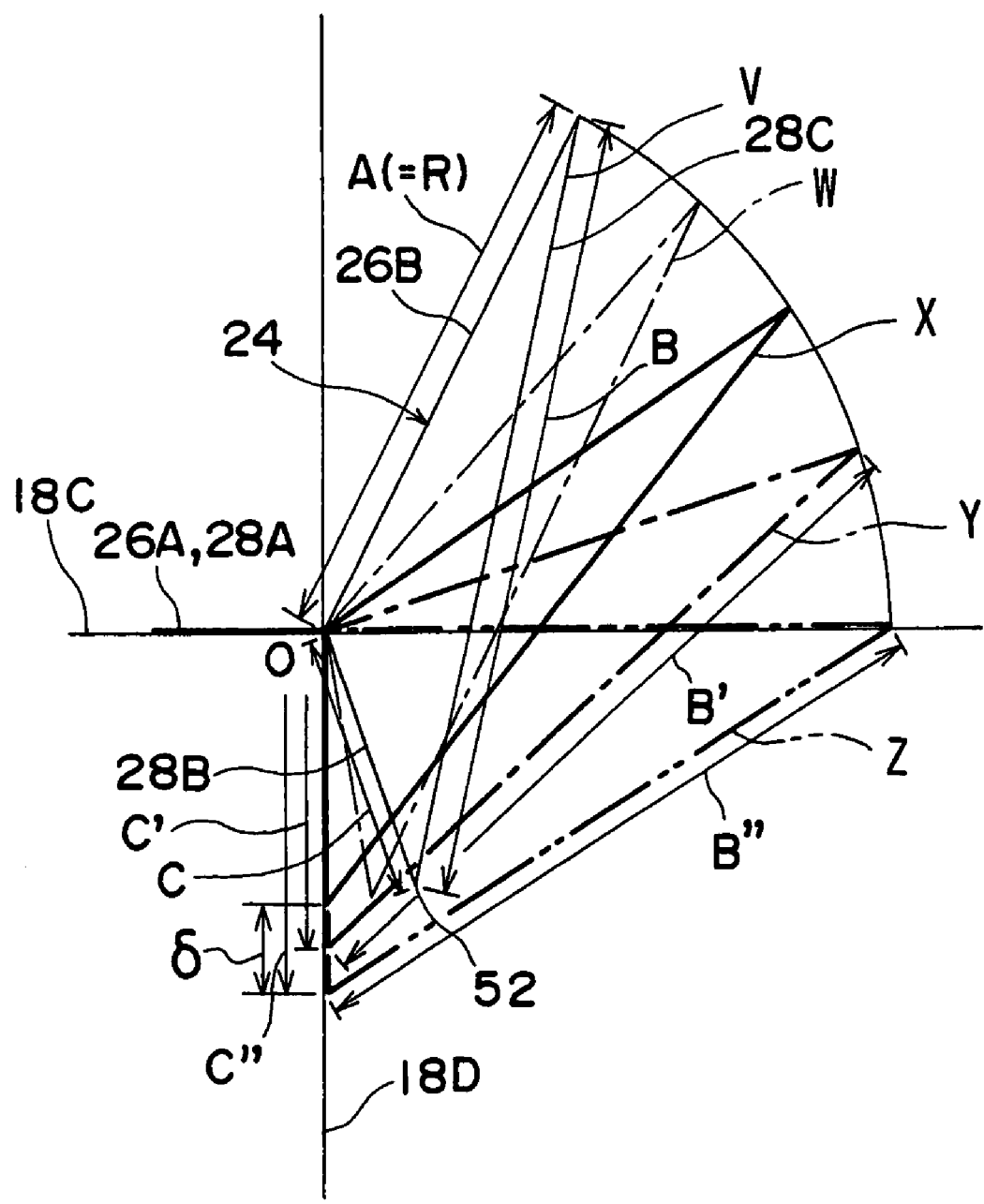
FIG. 4 is a schematic diagram showing deformation modes of the impact absorption bracket shown in FIG. 3.

Explanation will be given below of details of the deformation behavior of the impact absorption brackets 24 at the time of the above impact. FIG. 4 shows a schematic diagram of the deformation behavior of the impact absorption bracket 24 applied as the vehicle fender panel mounting structure shown in FIG. 1. Line V in FIG. 4 represents the impact absorption bracket 24 in the assembled state, line W represents the impact absorption bracket 24 in a state when it is in the process of tilting in toward the vehicle width direction inside (toward the arrow A direction side), and line X represents the impact absorption bracket 24 in a state at the point when it has just contacted the upright wall portion 18D of the apron upper member 14.

Up to the point when the impact absorption bracket 24 contacts the upright wall portion 18D of the apron upper member 14, the impact absorption bracket 24 exhibits a rotation movement centered about point O and rotation toward the width direction inside with the length of the first angled portion 26B as the radius of rotation R. Thereby, not only the line length A of the first angled portion 26B that has been allocated the label line V, but also the line length B of the inside second angled portion 28C and the line length C of the outside second angled portion 28B, rotate (tilt in) while remaining substantially of the same dimensions.

Then, at the stage of line X, the outside second angled portion 28B of the impact absorption bracket 24 contacts with the upright wall portion 18D of the apron upper member 14, and from this point onwards reactive force from the upright wall portion 18D of the apron upper member 14 acts on the inside second angled portion 28C of the impact absorption bracket 24.

Due to this, the impact absorption bracket 24 becomes that of the line Y of the next stage, that is to say the inside second angled portion 28C receives the reaction force from the upright wall portion 18D, and the line length of the inside second angled portion 28C shortens from B to B', and the line length of the outside second angled portion 28B correspondingly lengthens from C to C'. That is to say, in this process bending deformation is generated in a bent portion 52 that is the connecting location of the outside second angled portion 28B with the inside second angled portion 28C, and so-called drawing deformation is initiated.

Furthermore, as the bending deformation of the bent portion 52 progresses, up to the line Z, the line length of the inside second angled portion 28C shortens further from B' to B", and the line length of the outside second angled portion 28B correspondingly lengthens from C' to C". In this process further bending deformation is generated in the bent portion 52, and the so-called drawing deformation continues to progress up to this point in time. In this exemplary embodiment the amount of drawing deformation is δ.

Figure 5:
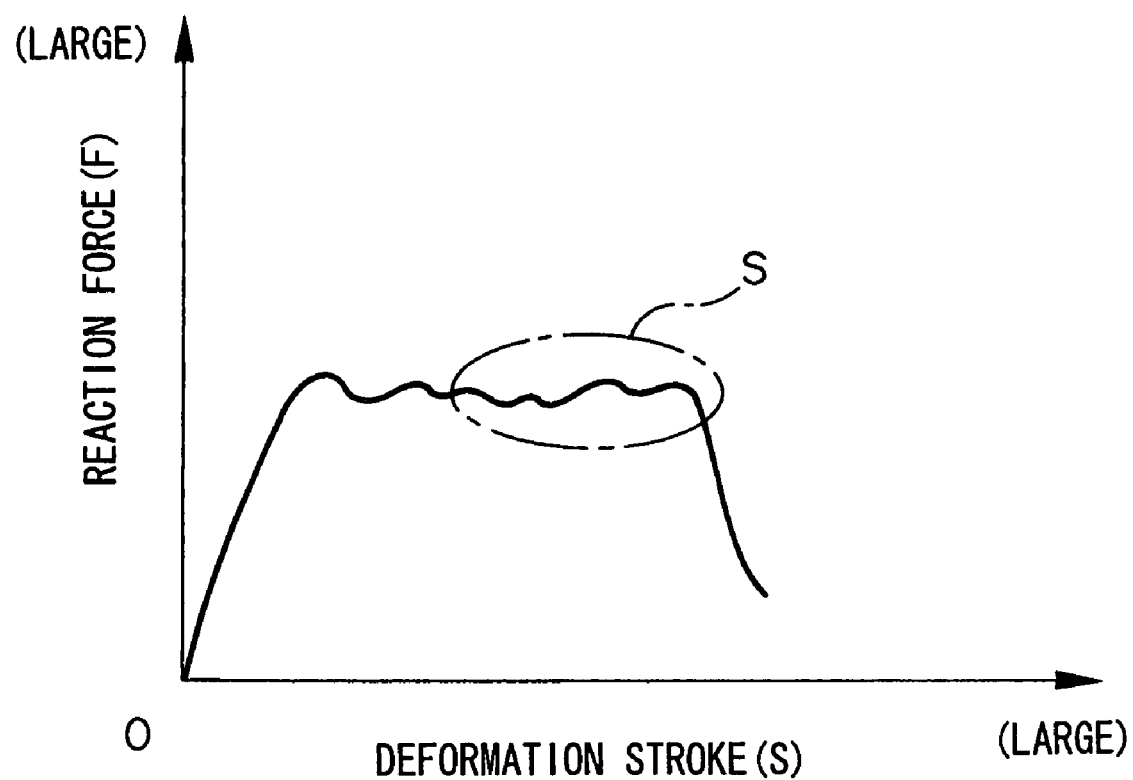
FIG. 5 is a graph showing the F-S characteristics when the impact absorption bracket shown in FIG. 1 has been applied.

By the above, as shown in the F-S characteristics in the graph of FIG. 5, the reaction force may be increased and maintained in the latter half of the reaction stroke (see the region S that is enclosed by the dotted line in the graph of FIG. 5). That is to say, according to the present exemplary embodiment, a reaction force may be obtained for energy absorption during the latter half of the stroke. As a result of this, by the vehicle fender panel mounting structure according to the present exemplary embodiment, good protection capability may be obtained for pedestrians, even when the break line portion 22, between the top end portion 10A' of the front fender panel 10 and the vehicle width direction outside edge portions 20A of the hood 20, is disposed offset in the vehicle width direction further inside than the disposed position of the apron upper member 14.

Also, in the present exemplary embodiment, the deformation behavior of the impact absorption bracket 24 at the time of impact with an impact object is formed with the rotational movement of the first angled portion 26B, and the bending deformation due to the change in the side length of the inside second angled portion 28C and that of the outside second angled portion 28B after the impact of the bent portion 52 with the upright wall portion 18D (in fact the sum of the side length of the inside second angled portion 28C and that of the outside second angled portion 28B, (B+C), is constant). The deformation modes are restricted with those rotational movement and the bending deformation. Therefore, according to the present exemplary embodiment, the impact absorption bracket 24 may be caused to deform in stable modes. As a result of this, the precision of the energy absorption capability (capability to protect pedestrians) may be raised.

Furthermore, in the present exemplary embodiment, the bent portion 52, which is the connection position between the inside second angled portion 28C and the outside second angled portion 28B, is disposed more to the vehicle width direction inside than the upper surface portion 18C and in the vicinity of the upright wall portion 18D. Therefore, the impact absorption bracket 24 may be quickly and reliably caused to deform at the time of impact with an impacted object. As a result of this, according to the present exemplary embodiment, the energy absorption capability (capability to protect pedestrians) may be raised.

In the present exemplary embodiment, the impact absorption bracket 24 has been configured in a top-bottom two-piece divided structure of the top side bracket 26 side configuring the first angled portion 26B, and the bottom side bracket 28 side configuring the inside second angled portion 28C and the outside second angled portion 28B. Accordingly, the performance requirements for the first angled portion 26B may be realized with high precision in the top side bracket 26, and the performance requirements of the inside second angled portion 28C and the outside second angled portion 28B may be realized with high precision in the bottom side bracket 28. As a result of this, according to the present exemplary embodiment, at a time of impact with an impacted object the energy absorption capability (capability to protect pedestrians) by the impact absorption bracket 24 may be made even more optimal.

Second Exemplary Embodiment

Explanation will now be given of a second exemplary embodiment of a vehicle fender panel mounting structure according to the present invention, with reference to FIG. 6 to FIG. 8. It should be noted that components of the configuration that are similar to those of the above described first exemplary embodiment are allocated the same reference numerals, and explanation thereof is omitted.

Figure 6:
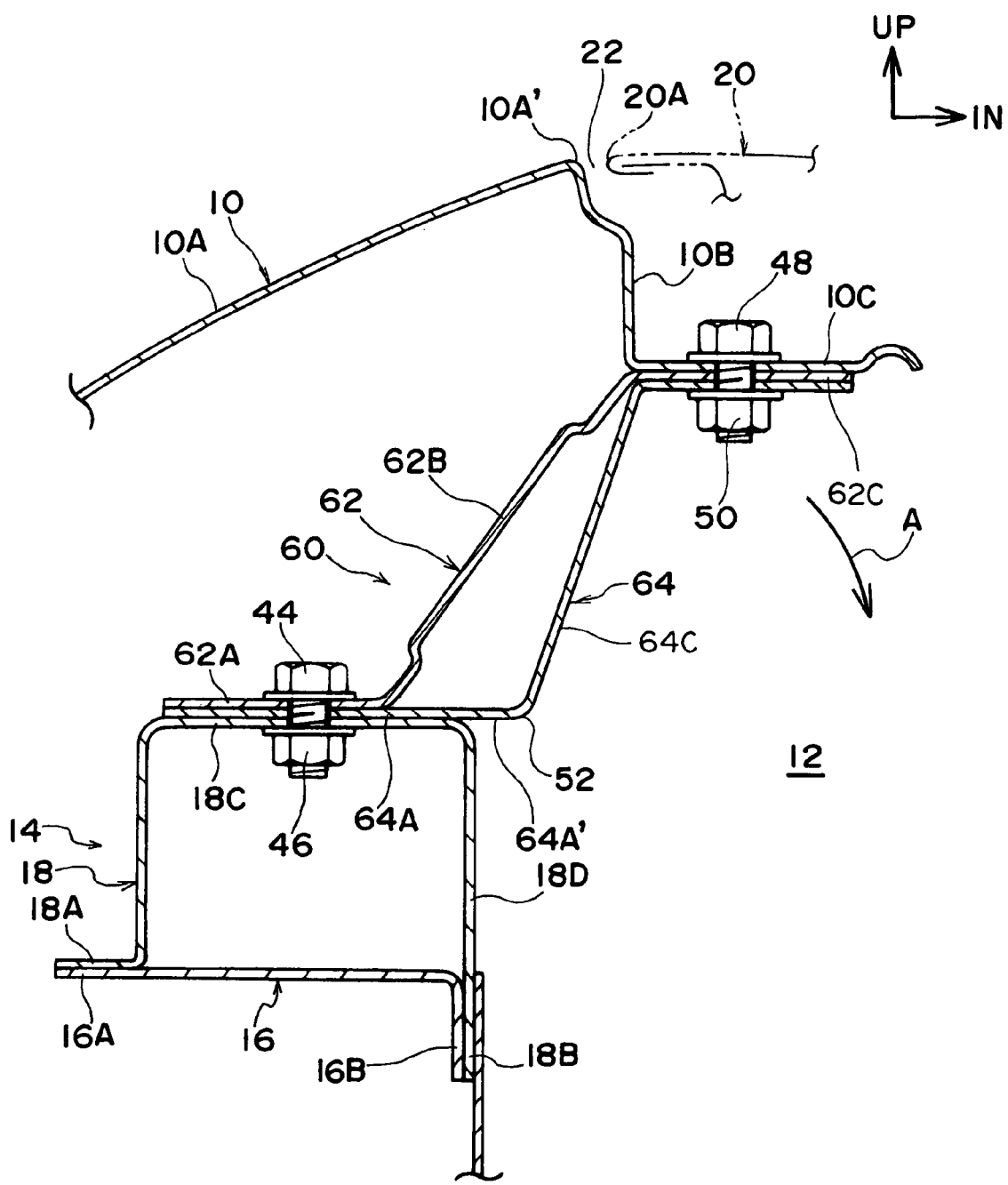
FIG. 6 is a vertical cross-section showing the overall configuration of a vehicle fender panel mounting structure according to a second exemplary embodiment, in an assembled state corresponding to that of FIG. 1.
Figure 7:
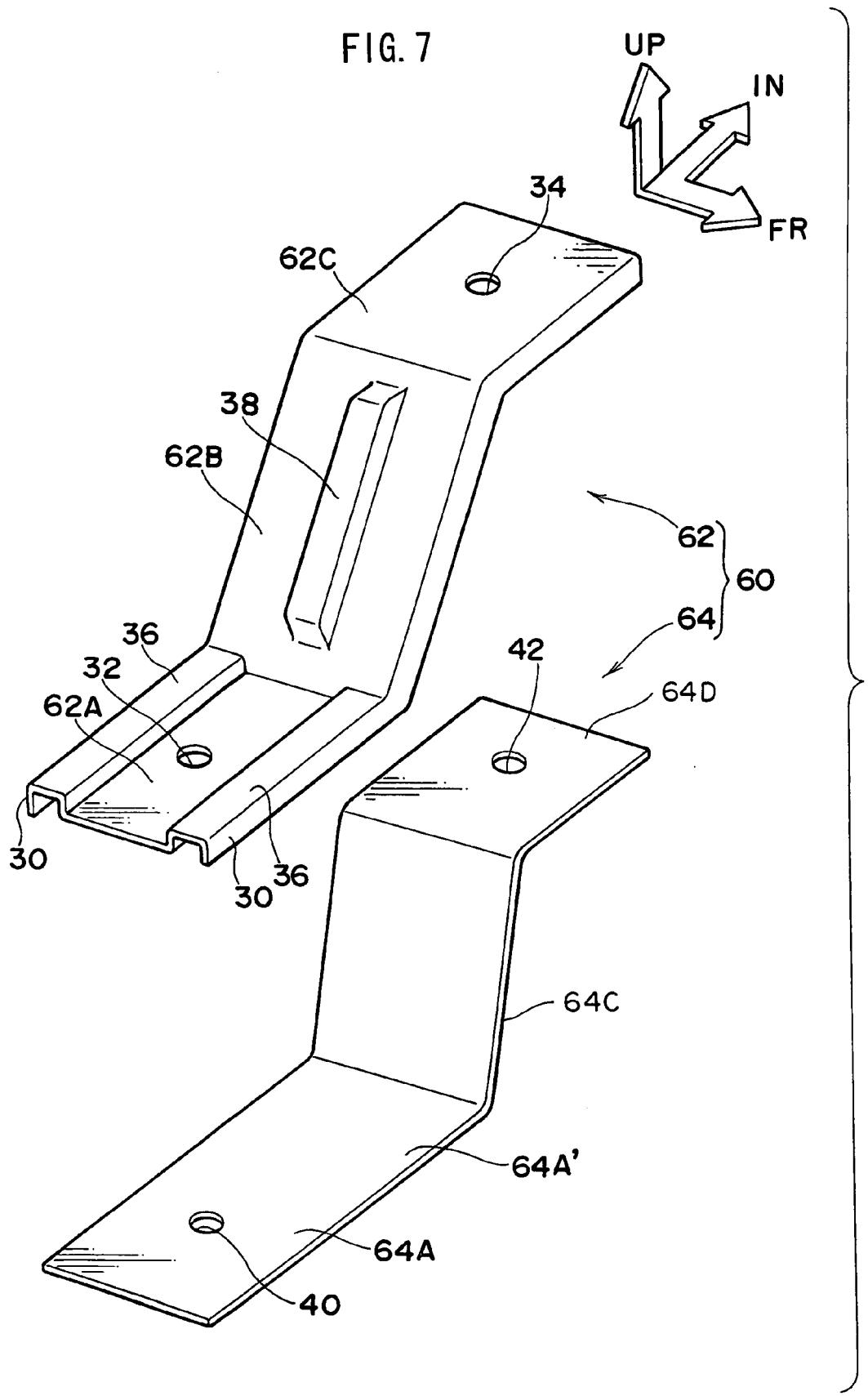
FIG. 7 is an exploded perspective view of the impact absorption bracket shown in FIG. 6.

As shown in FIGS. 6 and 7, the vehicle fender panel mounting structure according to this second exemplary embodiment is an impact absorption bracket 60, characterized by a substantially Z-shape when viewed from the side of the vehicle front.

Specifically, the impact absorption bracket 60 is configured with a top side bracket 62 configuring the top face side thereof, and a bottom side bracket 64 configuring the bottom face side thereof. The top side bracket 62, in the same manner as that of the top side bracket 26 explained in the above described first exemplary embodiment, is configured with: a base portion 62A extending along the vehicle width direction; a first angled portion 62B bending around from the base portion 62A and extending diagonally upward and to the inside of the vehicle; and a top end mounting portion 62C bending around from the top end portion of the first angled portion 62B toward the vehicle width direction inside and disposed at the bottom face side of the fender mounting portion 10C. However, the base portion 62A is formed shorter than the base portion 26A of the top side bracket 26 of the first exemplary embodiment, and is disposed in a position that is offset by a predetermined distance further toward the outside in the vehicle width direction than the upright wall portion 18D of the apron upper member 14. Therefore, the angle of inclination of the first angled portion 62B with respect to the upper surface portion 18C of the apron upper member 14 is less than that of the first angled portion 26B of the top side bracket 26.

The bottom side bracket 64 is different from the bottom side bracket 28 explained in the above described first exemplary embodiment in that it is formed into a substantially Z-shape when viewed from the side of the vehicle front. The bottom side bracket 64 is configured with: a base portion 64A, as a mounting portion to the upper surface portion 18C of the apron upper member 14; a second angled portion 64C, bending around diagonally from the end portion at the inside in the vehicle width direction of this base portion 64A and extending up diagonally toward the vehicle upper and inner sides; and an upper mounting portion 64D bending back from the top end portion of the second angled portion 64C and toward the vehicle width direction inside and disposed in a state of contact with the top face of the top end mounting portion 62C of the top side bracket 62. The length in the vehicle width direction of the base portion 64A is set longer than that of the base portion 28A of the bottom side bracket 28 in the first exemplary embodiment, and the base portion 64A extends out by this amount further to the inside in the vehicle width direction than the disposed position of the upright wall portion 18D of the apron upper member 14. In other words, in the impact absorption bracket 60, by not using the inside second angled portion 28C of the impact absorption bracket 24 on the bottom side bracket 64, the second angled portion 64C does not extend to a position in which it opposes the upright wall portion 18D of the apron upper member 14 in the vehicle width direction, but, when impact load of an impact object acts, the impact absorption bracket 60 rotationally deforms toward the vehicle bottom side (toward the arrow A direction side), and a bent portion 52, which is the connection position between the second angled portion 64C and the base portion 64A becomes opposing to the upright wall portion 18D. In this respect it could be said that the second angled portion 64C is configured so as to extend from the top end mounting portion 62C of the first angled portion 62B to a position in which it is able to oppose, in the vehicle width direction, the upright wall portion 18D.

(Operation and Effect)

Since the present exemplary embodiment basically also follows the configuration of the above described first exemplary embodiment, similar operation and effects may be obtained, however, since the deformation behavior of the impact absorption bracket 60 when an impact object has impacted in the vicinity of the break line portion 22 is slightly different, the following explanation will focus on this point.

Figure 8:
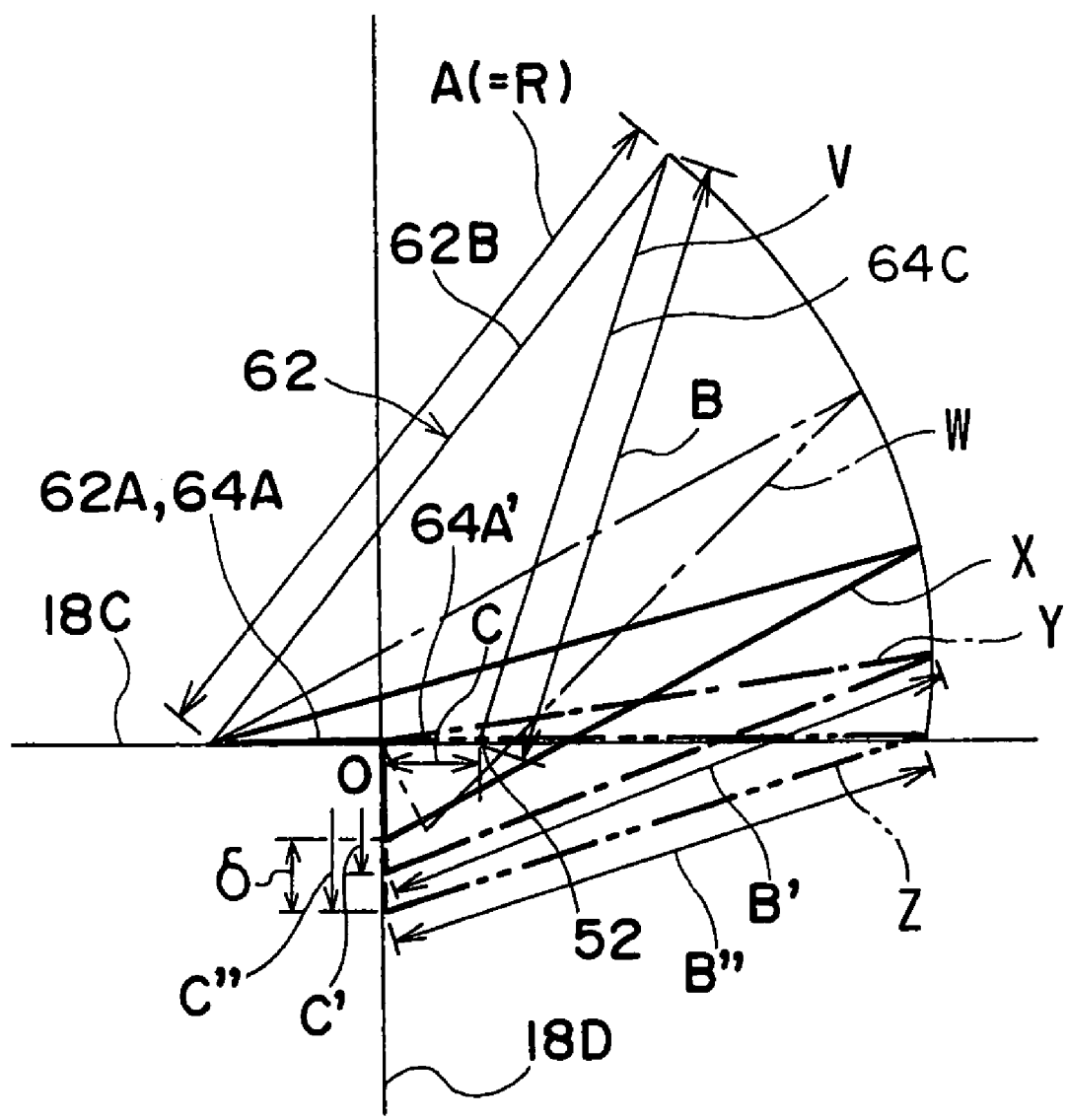
FIG. 8 is a schematic diagram showing deformation modes of the impact absorption bracket shown in FIG. 7.

FIG. 8 shows a schematic diagram of the deformation behavior of the impact absorption bracket 60 when the vehicle fender panel mounting structure according to the present exemplary embodiment is applied, and corresponds to FIG. 4 of the first exemplary embodiment.

As may be discerned from a comparison of FIG. 8 with FIG. 4, in the assembled state shown by the line V, the bent portion 52 that is the connection location of the second angled portion 64C with the base portion 64A does not oppose the upright wall portion 18D of the apron upper member 14. When, from this state, impact load of an impact object acts in the vicinity of the break line portion 22, as shown by the line W, and a jutting out portion 64A' of the base portion 64A of the bottom side bracket 64 bends toward the vehicle bottom side, and the impact absorption bracket 60 assumes a state that has been rotated about the point O by a predetermined angle.

Then, at the stage of the line X, the jutting out portion 64A' of the base portion 64A of the impact absorption bracket 60 contacts with the upright wall portion 18D of the apron upper member 14, and from this point onward, there is a reaction force from the upright wall portion 18D of the apron upper member 14 acting on the second angled portion 64C of the impact absorption bracket 60.

The impact absorption bracket 60 therefore assumes the next stage of line Y, that is to say, the reaction force is received from the upright wall portion 18D and the line length of the second angled portion 64C shortens from B to B', and the line length of the jutting out portion 64A' of the base portion 64A correspondingly lengthens from C to C'. By this process, bending deformation is generated in the bent portion 52 that is the connection location of the second angled portion 64C and the base portion 64A, and so-called drawing deformation is initiated.

When the bending deformation of the bent portion 52 further progresses, up to the line Z, further reaction force is received from the upright wall portion 18D and the line length of the second angled portion 64C shortens from B' to B", and the line length of the jutting out portion 64A' of the base portion 64A further lengthens by a corresponding amount from C' to C". Bending deformation to the bent portion 52 is also generated by this process, and so-called drawing deformation continues to progress up to this point in time. In the present exemplary embodiment the amount of drawing deformation is δ.

By the above described process, in the present exemplary embodiment too, in a similar manner to that of the above described first exemplary embodiment, the reaction force in the latter half of the F-S characteristics stroke may be increased and maintained. That is to say, a reaction force may be obtained for energy absorption in the latter half of the deformation stroke. As a result of this, by the vehicle fender panel mounting structure according to the present exemplary embodiment, good protection capability may be obtained for pedestrians, even when the break line portion 22 between the top end portion 10A' of the front fender panel 10 and the vehicle width direction outside edge portions 20A of the hood 20 is disposed offset to the vehicle width direction inside from the disposed position of the apron upper member 14 that is the corresponding mount for the front fender panel 10.

In the same manner as in the above described first exemplary embodiment, the deformation behavior of the impact absorption bracket 60 at a time of impact with an impacted object is a rotation movement of the first angled portion 62B, and a bending deformation due to a change in side length of the second angled portion 64C and that of the jutting out portion 64A' of the base portion 64A after the bent portion 52 has contacted the upright wall portion 18D (in fact the sum of the side lengths of the second angled portion 64C and the jutting out portion 64A' of the base portion 64A, (B+C), is constant). Deformation modes are restricted with those rotation movement of the first angled portion 62B and bending deformation of the second angled portion 64C and the jutting out portion 64A' of the base portion 64A. Therefore, according to the present exemplary embodiment, the impact absorption bracket 60 may be caused to deform in stable modes, and the precision of the energy absorption capability (capability to protect pedestrians) of the impact absorption bracket 60 may be raised.

Since, in the present exemplary embodiment, the impact absorption bracket 60 has been configured in a top-bottom two-piece divided structure, the performance requirements for the first angled portion 62B may be realized with high precision in the top side bracket 62, and the performance requirements of the second angled portion 64C and those of the jutting out portion 64A' of the base portion 64A may be realized with high precision in the bottom side bracket 64. Therefore, also in the present exemplary embodiment, at a time of impact with an impacted object, the energy absorption capability (capability to protect pedestrians) by the impact absorption bracket 60 may be made even more optimal.

Third Exemplary Embodiment

Explanation will now be given of a third exemplary embodiment of a vehicle fender panel mounting structure according to the present invention, with reference to FIG. 9 to FIG. 11. It should be noted that components of the configuration that are similar to those of the above described first exemplary embodiment are allocated the same reference numerals, and explanation thereof is omitted.

The impact absorption brackets 70, 72, 74 explained below are characterized in that an upper portion 76 that corresponds to the top side bracket 26, and a lower portion 78 that corresponds to the bottom side bracket 28, are formed into one integral component. It should be noted that each portion of the upper portion 76 and the lower portion 78 that is common from a configuration perspective to those of the impact absorption bracket 24 explained in the first exemplary embodiment are allocated the similar reference label in which the tens digit numeral 2 is replaced with 7. For example, labels are allocated so that "first angled portion 26B" becomes "first angled portion 76B", and duplicate explanation thereof is omitted.

Figure 9:
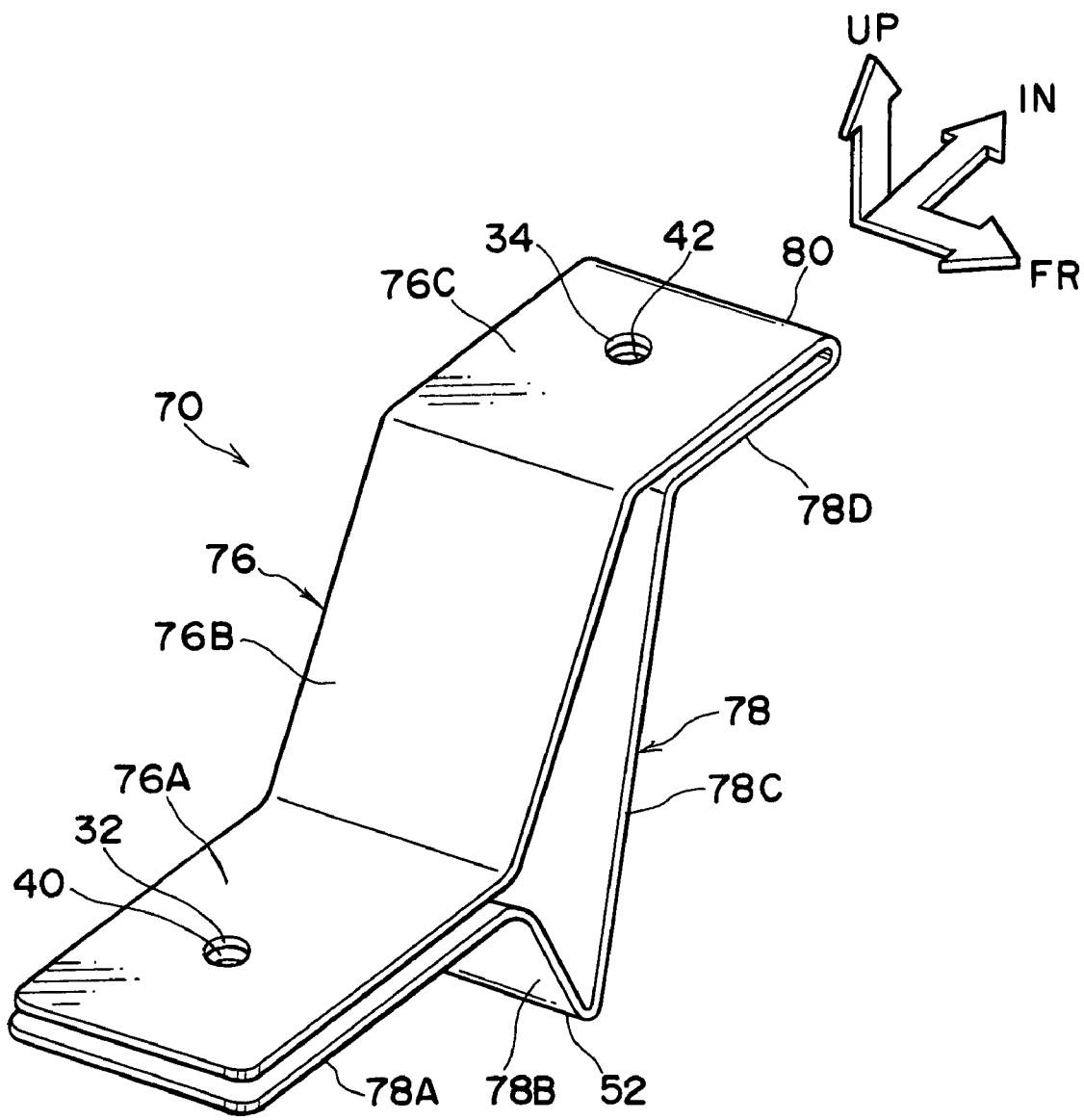
FIG. 9 is a perspective view of an impact absorption bracket (folded one-piece type) according to a third exemplary embodiment.

For example, in the impact absorption bracket 70 shown in FIG. 9, as an example sequence, after being knocked out of a press in the unfolded state of the impact absorption bracket 70, respective bending is carried out such that at the upper portion 76 a base portion 76A, a first angled portion 76B, and a top end mounting portion 76C are formed, or such that at the lower portion 78 a base portion 78A, an outside second angled portion 78B, an inside second angled portion 78C and a top end mounting portion 78D are formed. Then, finally, the upper portion 76 is fold bended (folded back) at a fold bend portion 80 toward the lower portion 78.

Figure 10:
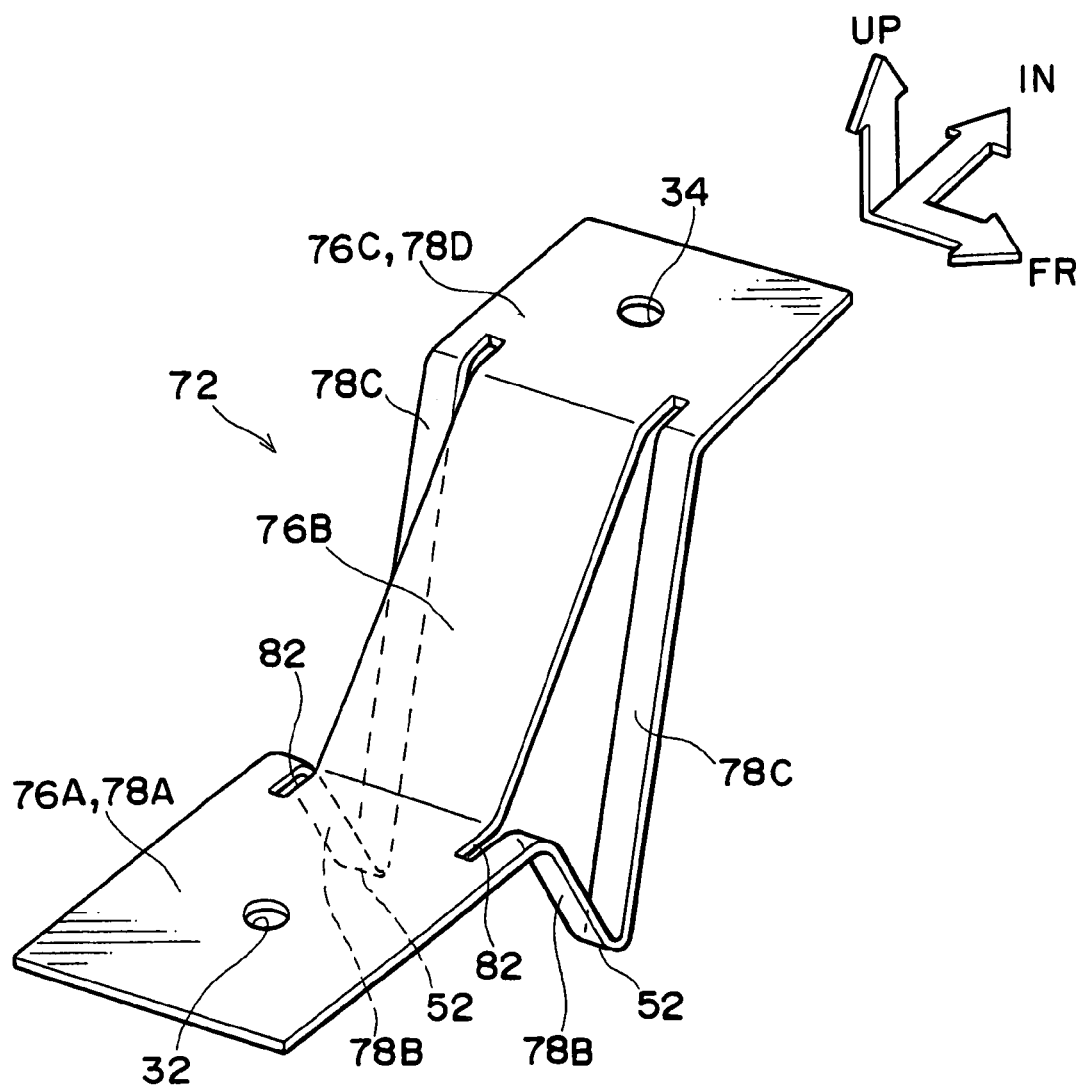
FIG. 10 is a perspective view of an impact absorption bracket (pressed one-piece type) according to a third exemplary embodiment.

Furthermore, in the impact absorption bracket 72 shown in FIG. 10, as an example sequence, at the same time as being knocked out of a press in the unfolded state of the impact absorption bracket 72 (including the front and rear pair of narrow slits 82), the first angled portion 76B side formed at a central portion, and the outside second angled portions 78B and the inside second angled portion 78C sides which are formed in two, front and rear, locations on either side of the central portion, are bent so as to be separated, respectively, up and down. In this case, the base portion 76A of the upper portion 76 side and the base portion 78A of the lower portion 78 side together with the top end mounting portion 76C of the upper portion 76 side and the top end mounting portion 78D of the lower portion 78 side are common.

Furthermore, the impact absorption bracket 74 shown in FIG. 11 is formed in a similar press knock-out state to that of the impact absorption bracket 72 of FIG. 10, but the outside second angled portion 78B and the inside second angled portion 78C are formed to the central portion, and first angled portions 76B are formed to two, front and rear, locations on either side of the central portion.

(Operation and Effect)

Since the impact absorption brackets 70, 72, 74 according to the third exemplary embodiment are configured as a bracket from a single component, the number of components may be reduced, and also the number of assembly processes may be reduced, in comparison to the first exemplary embodiment and the second exemplary embodiment. Therefore a reduction in cost may be achieved.

Also, since a bracket may be made from a single plate with the impact absorption brackets 72, 74, manufacture is simple, and a reduction in weight may be achieved, in comparison to the two-component configured impact absorption brackets 24, 26 and to the folded one-piece type impact absorption bracket 70 shown in FIG. 9.

Fourth Exemplary Embodiment

Explanation will now be given of a fourth exemplary embodiment of a vehicle fender panel mounting structure according to the present invention, with reference to FIG. 12 to FIG. 14. It should be noted that components of the configuration that are similar to those of the above described first exemplary embodiment are allocated the same reference numerals, and explanation thereof is omitted.

The impact absorption bracket 90, 92, 94 according to the fourth exemplary embodiment explained below are characterized in that they are provided with a deformation load adjusting mechanism.

Figure 12A:
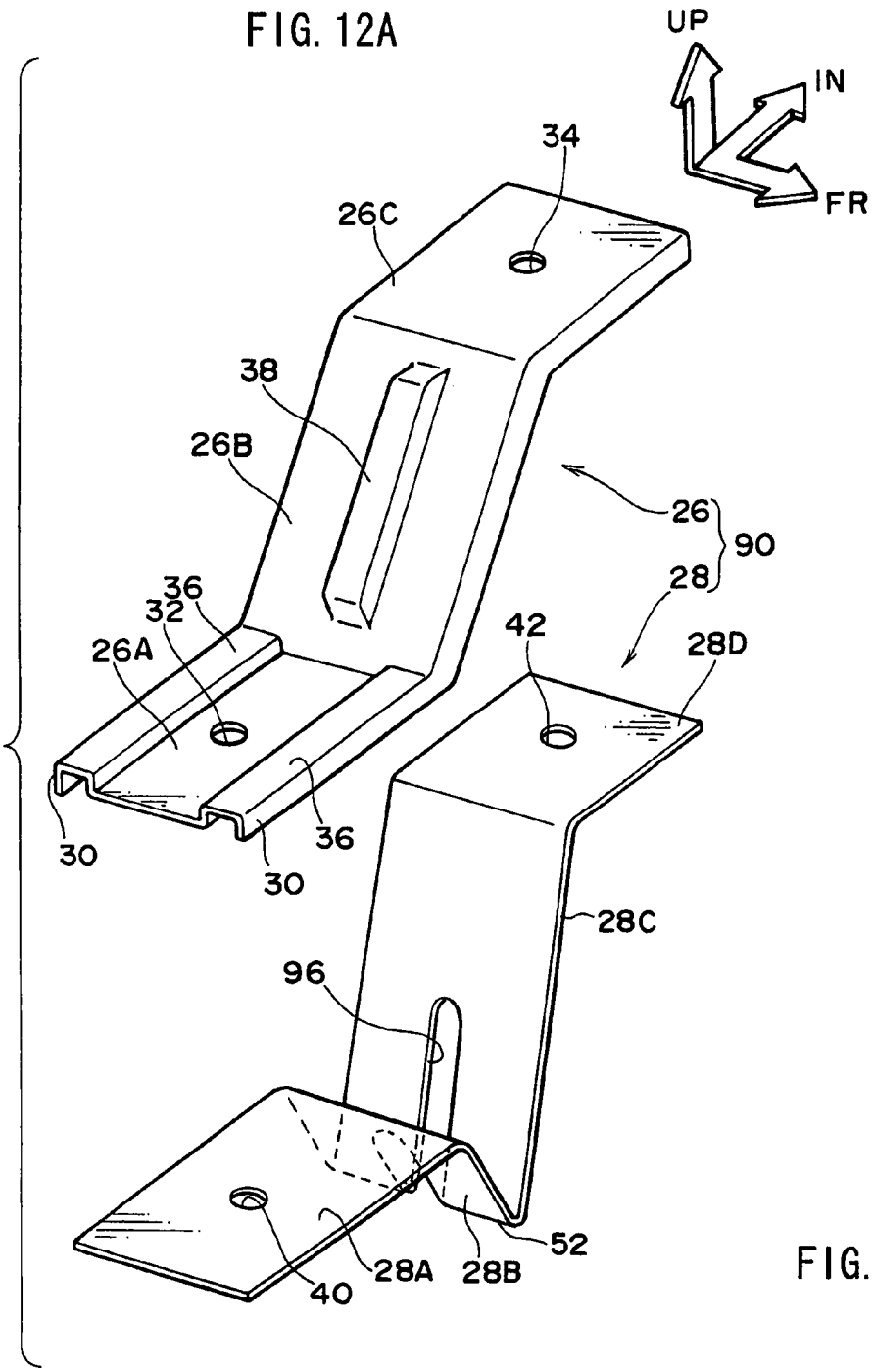
FIG. 12A is a perspective view of an impact absorption bracket (slit type) according to a fourth exemplary embodiment.
Figure 12B:
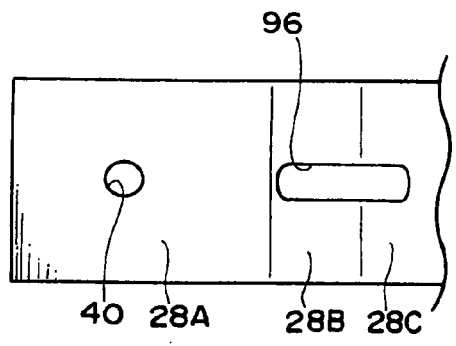
FIG. 12B is an expanded plan view in which a portion of the bottom side bracket has been enlarged.

For example, in the impact absorption bracket 90 shown in FIG. 12, the top side bracket 26 and the bottom side bracket 28 of the described impact absorption bracket 24 are used as they are, but the impact absorption bracket 90 is characterized in that a further single slit 96 is formed as a deformation load adjusting mechanism to the outside second angled portion 28B and to the inside second angled portion 28C of the bottom side bracket 28. The slit 96 passes through the bent portion 52 and is formed to straddle the outside second angled portion 28B and the inside second angled portion 28C.

Figure 13:
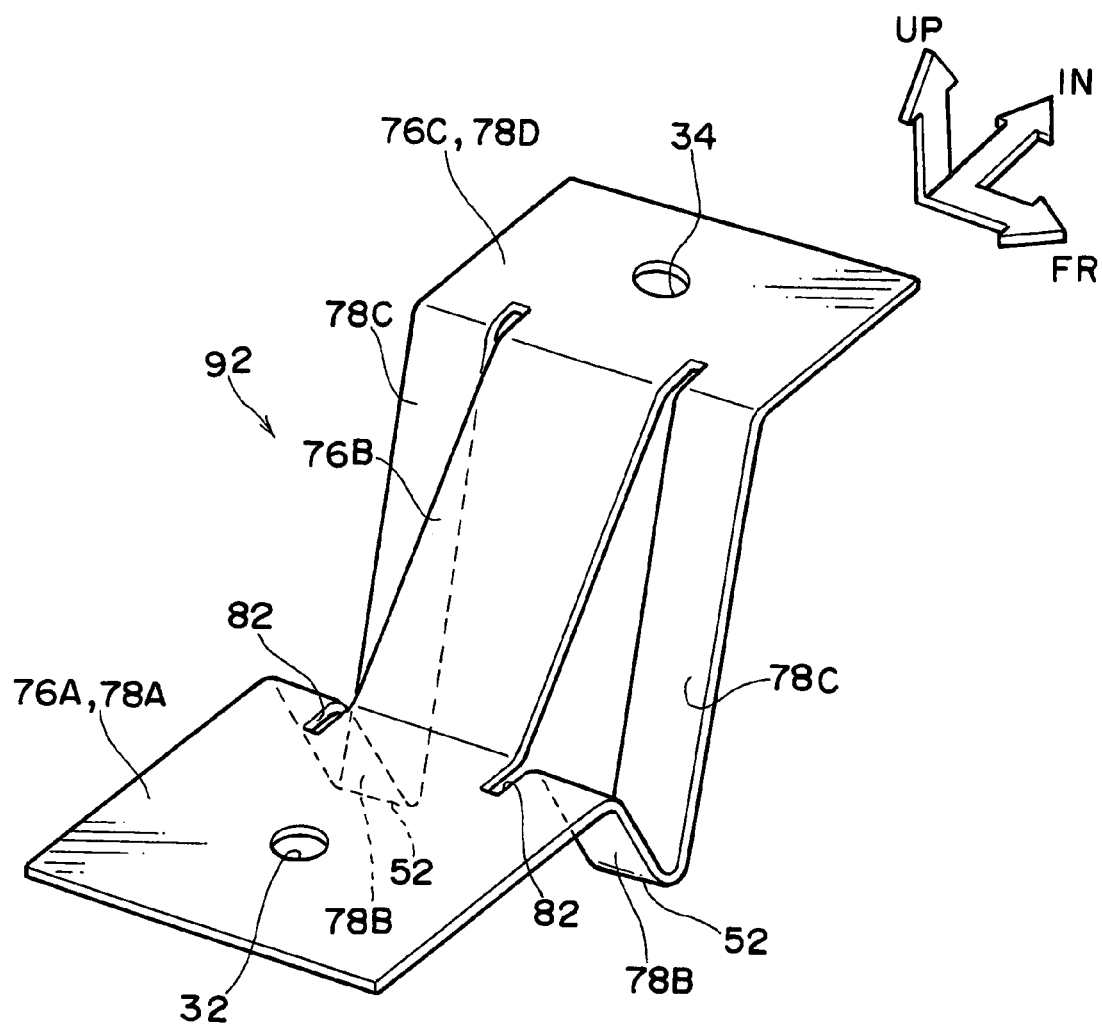
FIG. 13 is a perspective view of an impact absorption bracket (changed plate width type) according to a fourth exemplary embodiment.

The impact absorption bracket 92 shown in FIG. 13 is also characterized in that the plate width of the front-rear pairs of the outside second angled portions 78B and of the inside second angled portions 78C of the impact absorption bracket 92 are set wider than those of the impact absorption bracket 72 shown in FIG. 10. It should be noted that along with this difference, the plate width overall is also wider than that of the impact absorption bracket 72 shown in FIG. 10.

Figure 14:
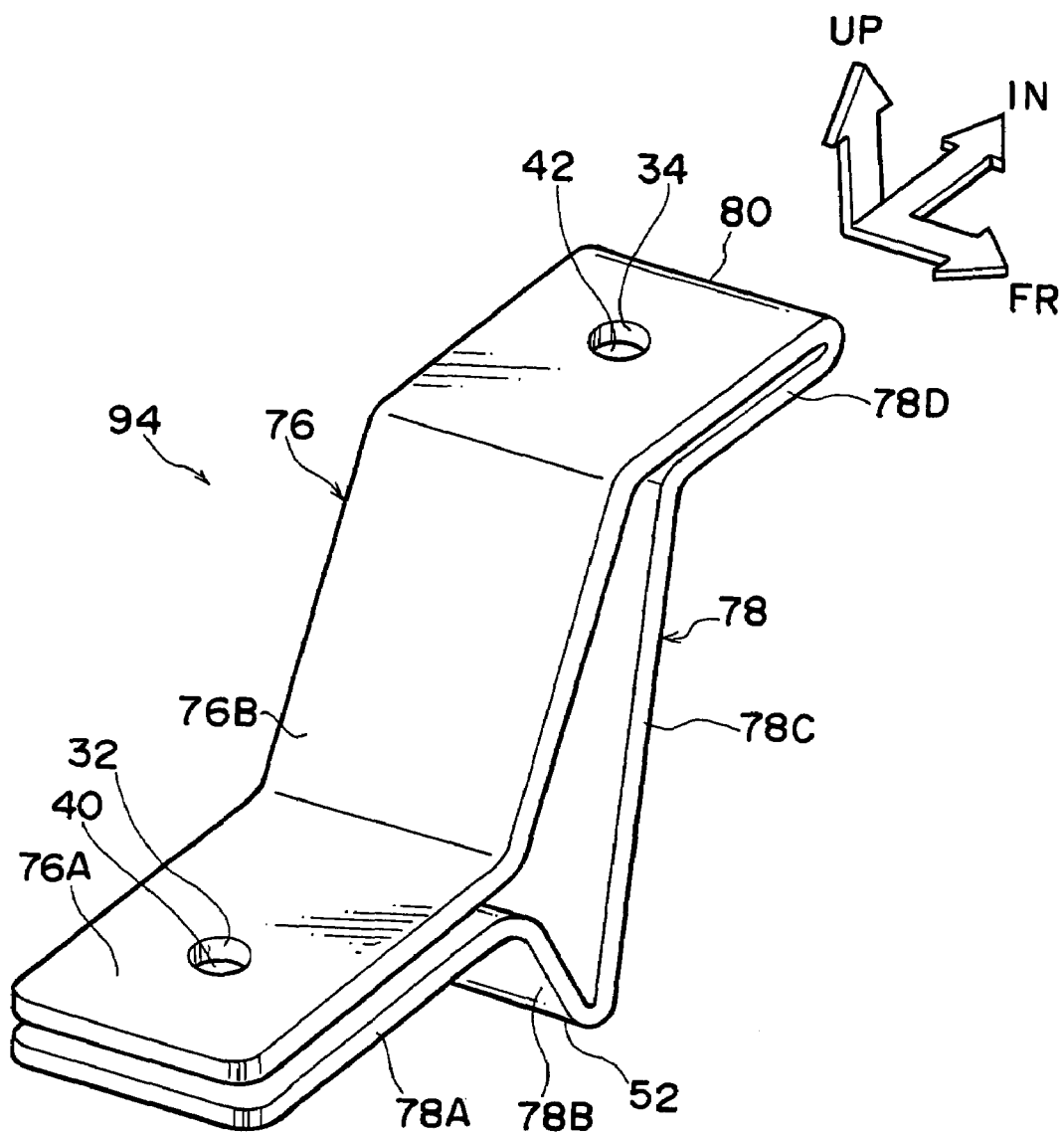
FIG. 14 is a perspective view of an impact absorption bracket (changed plate thickness type) according to a fourth exemplary embodiment.

Furthermore, the impact absorption bracket 94 shown in FIG. 14 is characterized in that the plate thickness thereof is set to be thicker than the plate thickness of the impact absorption bracket 70 shown in FIG. 9.

(Operation and Effects)

By the impact absorption brackets 90, 92, 94 according to the fourth exemplary embodiment, there is a deformation load adjusting mechanism, such as the slit 96, provided for adjusting the deformation load at the time of an impact, therefore adjustment may be made such that the wave form of the F-S characteristics of the impact absorption bracket is as desired. That is to say, by the method of providing the slit 96 or the like, the deformation load of the outside second angled portion 28B and that of the inside second angled portion 28C may be changed, and the load may be controlled up to the point at which the bent portion 52 contacts the upright wall portion 18D of the apron upper member 14; or the reaction force may be controlled onward from the time of contact of the bent portion 52 with the upright wall portion 18D. Furthermore, by the method of providing the slit 96 or the like, deformation load of the first angled portion 26B may be changed. Therefore, adjustment of the load (wave form) in the front half of the stroke of the F-S characteristics, and adjustment of the load (wave form) in the latter half of the stroke of the F-S characteristics, may be easily carried out. As a result of this, according to the present exemplary embodiment, the energy absorption capability (capability to protect pedestrians) may be set to the optimum according to the vehicle type.

It should be noted that the impact absorption brackets 90, 92, 94 shown in FIG. 12 to FIG. 14 are only a few examples of deformation load adjusting mechanisms, and the plate width of the outside second angled portion 78B and that of the inside second angled portion 78C may be changed, or plural holes may be formed in place of the slit. A rib may also be provided. Furthermore, in the example of providing the slit 96, by changing the number of individual slits 96 and their size, the slit width and the like the deformation load may be adjusted as desired.

In the above exemplary embodiments, the corresponding mount of the impact absorption bracket 24 etc. is the apron upper member 14, however, there is no limitation thereto, and another vehicle body side configuring member may be used, such as a radiator support upper, a suspension tower or the like, as long as there is an upright wall portion for providing the reaction force when the impact absorption bracket 24 etc. deforms. Also, at the vehicle body side configuring members of an apron upper member 14 provided with a bracket, for example, separate components fixed to the apron upper member 14 are included that are not in themselves the apron upper member 14.

Also, in the above exemplary embodiment, all of the impact absorption brackets 24 etc. are made from metal, but there is no limitation thereto, and impact absorption brackets made from resins and the like are also suitable. Also, from a choice of metals the impact absorption brackets 24 etc. were made of steel plate, however, they may be configured from materials including aluminum or from material including magnesium. By changing to substances like these, it is possible to adjust the deformation load as explained in the fourth exemplary embodiment. Also, even when made from metal, when an element of the impact absorption bracket has a given cross-section, an impact absorption bracket may be manufactured by extrusion molding using aluminum alloy or the like.

In the above described exemplary embodiments, it was configured such that bending deformation occurred successively, originating at the bent portion 52, from the inside second angled portion 28C to the outside second angled portion 28B, however, there is no limitation thereto, and a configuration may be adopted in which intermittent bending deformation occurs originating at the bent portion 52.

In the above exemplary embodiment, configurations were adopted in which the bent portion 52 was disposed in the vicinity of the upright wall portion 18D, however, there is no limitation thereto, and a configuration may be adopted in which the bent portion 52 is disposed adjacent to the upright wall portion 18D.

Also, in the invention there is "a connecting portion, connecting the bottom end portion of the second angled portion to the bottom end portion of the first angled portion", however, for example, explaining with reference to the first exemplary embodiment, as shown in FIG. 4, a configuration is suitable as long as a line segment 28B is discernable, geometrically connecting the bottom end portion of the line segment 28C and the bottom end portion of the line segment 26B. Therefore, as shown in FIG. 1, a configuration in which bolt fastening points exist in the center of the base portions 26A, 28A is suitable, or a configuration in which, corresponding to the connecting portion, the top end portion of the outside second angled portion 28B simply contacts with the bottom end portion of the first angled portion 26B is suitable, or a configuration in which they are joined by welding or the like, is also suitable.

A first aspect of the present invention is a vehicle fender panel mounting structure including: a fender panel top end side mounting portion, disposed at a vehicle body front portion side face; a vehicle body side structural member, disposed further to the outside in the vehicle width direction, and further to the vehicle bottom side, than the fender panel top end side mounting portion, the vehicle body side structural member being the corresponding mount of the fender panel top end side mounting portion; and an impact absorption bracket joining the fender panel top end side mounting portion and the vehicle body side structural member. The impact absorption bracket includes: a first angled portion, connecting the fender panel top end side mounting portion and the vehicle body side structural member in a substantially straight line; a second angled portion, extending from a position at the top end of the first angled portion to a position that opposes in the vehicle width direction, or is able to oppose, an upright wall portion provided to the vehicle body side structural member; and a connecting portion that connects the bottom end portion of the second angled portion to the bottom end portion of the first angled portion.

In the above described aspect, the impact absorption bracket may deform due to an impact object impacting from a hood top side in the vicinity of a break line portion, the break line portion locates between an edge portion at the outside in the vehicle width direction of the hood that is disposed at the vehicle body front portion top face and a top end portion of the fender panel, absorbing energy from the time of impact According to the above aspect, the fender panel top end side mounting portion is mounted to the vehicle body side structural member through the impact absorption bracket, and when an impact object impacts from a hood top side in the vicinity of a break line portion, between an edge portion at the outside in the vehicle width direction of the hood that is disposed at the vehicle body front portion top face and a top end portion of the fender panel, energy from the time of impact is absorbed by the impact absorption bracket deforming.

Since the vehicle body side structural member is disposed further to the outside in the vehicle width direction and further to the vehicle bottom direction side than the fender panel top end side mounting portion, or in other words, since a vehicle design is adopted in which the break line portion between the hood and the fender panel is disposed offset further to the vehicle width direction inside than the disposed position of the vehicle body side structural member that is the corresponding mount of the fender panel, when there is an impact in the vicinity of the break line portion, since the impact absorption bracket does not have a member supporting this region from below, the break line portion tends to tilt in toward the vehicle width direction inside.

However, by the above aspect, the impact absorption bracket is configured to include a first angled portion, a second angled portion and a connection portion, and the second angled portion extends to a position that opposes in the vehicle width direction, or is able to oppose, an upright wall portion provided to the vehicle body side structural member, and the connection portion connects together the bottom end portion of the second angled portion and the bottom end portion of the first angled portion, when the impact absorption bracket tries to tilt in toward the vehicle width direction inside, this is accompanied by contact of the connecting location of the second angled portion and the connection portion (the bottom end portion of the second angled portion) with the upright wall portion of the vehicle body side structural member. By this contact, a reaction force from the upright wall portion acts on the second angled portion and there is bending deformation of the connecting location of the second angled portion and the connection portion (such that the second angled portion rolls around to the connection portion). This bending deformation is generated from the point in time when the impact absorption bracket tilts in toward the inside in the vehicle width direction and the connecting location of the second angled portion and the connection portion (the bottom end portion of the second angled portion) makes contact with the upright wall portion. Therefore, if you look at the relationship between this phenomenon and the F-S characteristics (looking at the imposed F-S characteristics), a reaction force may be obtained in the latter half of the stroke for energy absorption.

According to the above aspect, there is the superior effect in which good protection capability may be obtained for pedestrians, even when the break line portion between the hood and the fender panel is disposed offset in the vehicle width direction further inside than the vehicle body side structural member that is the corresponding mount for the fender panel.

In the above described aspect, the vehicle fender panel mounting structure may be configured such that: at a time of impact by an impact object, the impact absorption bracket tilts in toward the inside in the vehicle width direction by rotation, with the bottom end portion of the first angled portion as the center of rotation and the side length of the first angled portion as the rotational radius; and, after the connection location of the second angled portion with the connection portion has contacted the upright wall portion of the vehicle body side structural member, bending deformation is generated in which, while the side length of the second angled portion is being reduced, the side length of the connection portion is increased by a corresponding amount along the upright wall portion.

According to the above aspect, the impact absorption bracket: at a time of impact by an impact object, tilts in toward the inside in the vehicle width direction rotating with the bottom end portion of the first angled portion as the center of rotation and the side length of the first angled portion as the rotational radius, and the connection location of the second angled portion with the connection portion contacts the upright wall portion of the vehicle body side structural member. In doing so, a reaction force from the upright wall portion to the second angled portion is generated, and by the action of the reaction force, the second angled portion deforms. Specifically, bending deformation is generated in which, while the side length of the second angled portion is being reduced, the side length of the connection portion is increased by a corresponding amount along the upright wall portion.

With respect to the behavior of the impact absorption bracket, deformation modes are restricted with the rotational movement of the first angled portion and bending deformation due to change in the side lengths between the second angled portion and the connection portion after the connection location of the second angled portion and the connection portion has contacted with the upright wall portion (in fact the total of the side lengths of the second angled portion and the connection portion is constant). Therefore, the impact absorption bracket may be caused to deform in stable modes.

Since the impact absorption bracket deformation modes are stabilized, there is the superior result in that the precision of the energy absorption capability (capability to protect pedestrians) may be raised.

In the above described aspects, the connection location of the second angled portion with the connection portion may be disposed further to the vehicle bottom direction side than a transverse wall portion provided at a position at the top end of the upright wall portion in the vehicle body side structural member, and disposed adjacent to, or in the vicinity of, the upright wall portion.

According to the above aspect, since the connection location of the second angled portion with the connection portion is disposed further to the vehicle bottom direction side than a transverse wall portion provided at a position at the top end of the upright wall portion in the vehicle body side structural member, and disposed adjacent to, or in the vicinity of, the upright wall portion, the connecting location of the second angled portion and the connection portion may be caused to contact the upright wall portion of the vehicle body side structural member from the initial stage of the impact absorption bracket tilting in toward the inside in the vehicle width direction. Thereby, the impact absorption bracket may be quickly and reliably caused to deform.

Since the impact absorption bracket deformation modes are stabilized, there is the superior result in that the precision of the energy absorption capability (capability to protect pedestrians) may be raised In the above described aspects, a deformation load adjustment mechanism may be provided to at least one of the second angled portion or the connection portion, the deformation load adjustment mechanism being for adjusting the deformation load at a time of impact by an impact object.

According to the above aspect, a deformation load adjustment mechanism, for adjusting the deformation load at a time of impact by an impact object, is provided to at least one of the second angled portion or the connection portion, and therefore, adjustment may be made such that the wave form of the F-S characteristics of the impact absorption bracket is as desired. That is to say, by the method of providing the deformation load adjusting mechanism, the deformation load of the second angled portion and the connection portion may be changed, and therefore the load up to the point at which the connecting location of the second angled portion and the connection portion contacts the upright wall portion of the vehicle body side structural member may be controlled, and/or the reaction force onward from the time of contact of the connecting location to the upright wall portion may be controlled. Furthermore, by the method of providing deformation load adjusting mechanism, deformation load of the first angled portion may be changed. Therefore, adjustment of the load (wave form) in the front half of the stroke of the F-S characteristics, and adjustment of the load (wave form) in the latter half of the stroke of the F-S characteristics, may be easily carried out.

Therefore, the energy absorption capability (capability to protect pedestrians) may be set to the optimum according to the vehicle type.

In the above aspects, the impact absorption bracket may be divided into a top side bracket configuring a first angled portion side thereof, and a bottom side bracket that is disposed at the bottom face side of the top side bracket and configures a second angled portion and a connection portion side thereof.

According to the above aspect, the impact absorption bracket is of a divided structure in which there is a top side bracket configuring the first angled portion side, and a bottom side bracket that is disposed at the bottom face side of the top side bracket and configures a second angled portion and connection portion side thereof, therefore, the performance requirements for the first angled portion may be realized with high precision in the top side bracket, and the performance requirements of the outside second angled portion may be realized with high precision in the bottom side bracket.

That is to say, the performance requirements demanded for each of the elements of the impact absorption bracket may be reproduced with high precision individually, and as a result of this, there is the superior result in which, the energy absorption capability (capability to protect pedestrians) by the impact absorption bracket, at a time of impact with an impacted object, may be made even more optimal.

In the some of the above aspects, the impact absorption bracket may be configured with a press-formed component that is provided with the first angled portion, the second angled portion and the connection portion, all integrated together as one.

According to the above aspect, since the impact absorption bracket is configured with a press-formed component that is provided with the first angled portion, the second angled portion and the connection portion, all integrated together as one, therefore production thereof is easy and also the number of components becomes one component.

Therefore, there is the superior result in which the structure may be simplified and a reduction in cost may be achieved.

The foregoing description of the exemplary embodiments of the present exemplary embodiment is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle fender panel mounting structure comprising:
   a fender panel top end side mounting portion, disposed at a vehicle body front portion side face;
   a vehicle body side structural member, disposed further to the outside in the vehicle width direction, and further to the vehicle bottom direction side, than the fender panel top end side mounting portion, the vehicle body side structural member being the corresponding mount of the fender panel top end side mounting portion; and
   an impact absorption bracket joining the fender panel top end side mounting portion and the vehicle body side structural member, the impact absorption bracket comprising:
   a first angled portion, connecting the fender panel top end side mounting portion and the vehicle body side structural member in a substantially straight line;
   a second angled portion, extending from a position at the top end of the first angled portion to a position that opposes in the vehicle width direction, or is able to oppose, an upright wall portion provided to the vehicle body side structural member; and
   a connecting portion that connects the bottom end portion of the second angled portion to the bottom end portion of the first angled portion.

2. The vehicle fender panel mounting structure according to claim 1, wherein the impact absorption bracket deforms due to an impact object impacting from a hood top side in the vicinity of a break line portion, the break line portion being located between an edge portion at the outside in the vehicle width direction of the hood that is disposed at the vehicle body front portion top face and a top end portion of the fender panel, and absorbs energy from the time of impact.

3. The vehicle fender panel mounting structure according to claim 1, wherein the impact absorption bracket:
   at a time of impact by an impact object, tilts in toward the inside in the vehicle width direction by rotation, with the bottom end portion of the first angled portion as the center of rotation and the side length of the first angled portion as the rotational radius; and after the connection location of the second angled portion with the connection portion has contacted the upright wall portion of the vehicle body side structural member, bending deformation is generated in which, while the side length of the second angled portion is being reduced, the side length of the connection portion is increased by a corresponding amount along the upright wall portion.

4. The vehicle fender panel mounting structure according to claim 1, wherein the connection location of the second angled portion with the connection portion is disposed further to the vehicle bottom direction side than a transverse wall portion provided at a position at the top end of the upright wall portion of the vehicle body side structural member, and disposed adjacent to, or in the vicinity of, the upright wall portion.

5. The vehicle fender panel mounting structure according to claim 1, wherein a deformation load adjustment mechanism is provided to at least one of the second angled portion or the connection portion, the deformation load adjustment mechanism being for adjusting the deformation load from a time of impact by an impact object.

6. The vehicle fender panel mounting structure according to claim 1, wherein the impact absorption bracket is divided into a top side bracket configuring a first angled portion side thereof, and a bottom side bracket that is disposed at the bottom face side of the top side bracket and configures a second angled portion and connection portion side thereof.

7. The vehicle fender panel mounting structure according to claim 1, wherein the impact absorption bracket is configured with a press-formed component that is provided with the first angled portion, the second angled portion and the connection portion, all integrated together as one.

* * * * *